United States Patent [19]

Netzer

[11] 4,188,093
[45] Feb. 12, 1980

[54] LARGE SAILBOAT VISIBILITY IMPROVEMENTS

[76] Inventor: Henry A. Netzer, 7441 Classic Dr., Glen Burnie, Md. 21061

[21] Appl. No.: 891,905

[22] Filed: Mar. 30, 1978

[51] Int. Cl.² ............................................. G02B 5/08
[52] U.S. Cl. ..................................... 350/303; 350/307
[58] Field of Search ............... 350/293, 303, 307, 476; 356/250; 248/474, 476, 479

[56] References Cited

U.S. PATENT DOCUMENTS

| | | | |
|---|---|---|---|
| 2,407,416 | 9/1946 | Gudmundson | 356/250 |
| 2,732,764 | 1/1956 | Parks | 350/307 X |
| 3,383,154 | 5/1968 | Reed | 350/293 |

*Primary Examiner*—F. L. Evans

[57] ABSTRACT

A pair of wide angle mirrors and mirror assemblies adapted to be mounted on the bow or bowrail of a large sailboat comprised of a pair of mirror brackets for use in fixing the mirrors to the bow or the bowrail of a sailboat, a pair of mirrors, means for mounting one of said mirrors so as to permit pivotal movement about a horizontal axis to each of said mounting brackets and means attached to each of said mirrors so that each mirror will maintain the reflecting surface thereof in a vertical plane without regard to the plane of the deck of the large sailboat, said assemblies, when attached to the bow or bowrail of a large sailboat, permitting the helmsman to see portions of the horizon forward, around, and behind the sails which, in the absence of this invention would be obscured by opaque sail material and further preventing dangerous impacts with other sailing or mechanized craft and with stationary object whose presence could not otherwise be detected by the helmsman prior to the initiation of any maneuver which would change the direction of the sailboat.

1 Claim, 3 Drawing Figures

LARGE SAILBOAT VISIBILITY IMPROVEMENTS

BACKGROUND OF THE INVENTION

The principal objects of the present invention are to provide a method wherein a Helmsman, who pilots a large sailboat can utilize wide angle mirrors which remain vertical when the ship is heeling. Prefabricated brackets hold the mirrors on the bow rails of large sailboats thus enabling the Helmsman to see both forward and obstacles in the water, primarily hidden by the Foresails.

The traditional method is to send a crew member forward for observation during races.

A more complete understanding can be derived from the descriptive reference characters in FIG. 1 FIG. 2 and FIG. 3.

Figure 1:
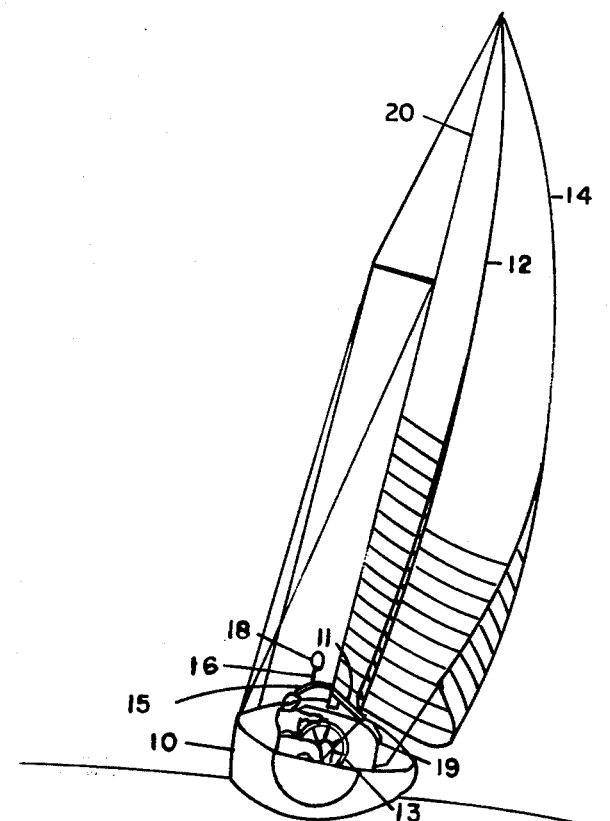
FIG. 1 illustrates a perspective view of this invention, where Helmsman uses mirrors.

Turning now to FIG. 1, we see the stern of a large sailboat moving away from us. The boat has a hull 10 and the boom 11 on which the main sail 12 is mounted. Now a Helmsman can see under a boom 11 and mainsail 12 since they are usually about a foot above the raised deck 19.

13 designates the Wheel or tiller as used on some crafts.

14 designates the Foresails. This could be a jib or genoa sail 14. Now these sails attach very close to the deck on the bow, and because of this, when you're on a port or starboard tack, or running you can only see half of the horizon in front.

15 designates the Bow rails: It's upon this rail that we mount the adjustable prefabricated bracket 16. This bracket holds the Wide angle mirror 18.

This view of drawing shows mast 20, from which main sail 12, and jib or genoa sail 14 are connected.

Figure 2:
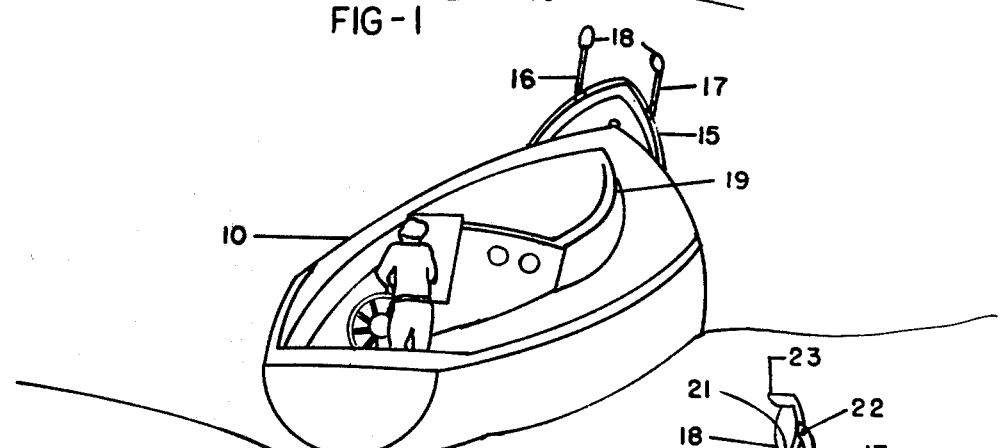
FIG. 2 illustrates large sailboat with mast and sail removed, so that the mechanical attached mirrors to the bow rails can be best understood and observed.

FIG. 2 - The drawing illustrates a hull 10 with mast 20 and sails 12 and 14 removed. Here it becomes apparent why brackets 16 and 17 are of different lengths. In case they are mounted too close to the bow, one won't focus into the other. Hence giving a better view forward. The bow rail 15 serves as a rugged base upon which the brackets 16 and 17 are mounted. This perspective view illustrates the hull 10, and raised deck 19.

Figure 3:
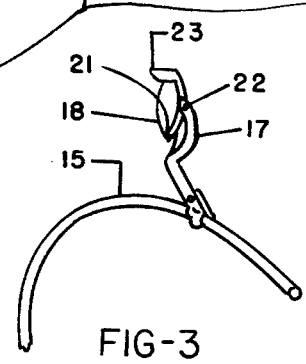
FIG. 3, is a perspective view embodying the mirror assemblies attached to bow rail while boat is heeling.

FIG. 3 - The bow rail 15 is leaning towards Port since the ship is heeling. Bracket 17, which is somewhat similar to bracket 16 in FIG. 2 is securely bolted to bow rail 15. The mirror 18, is allowed to pivot on pins 22. The weight 21 holds mirror 18 vertically, so we always see the horizon, rather then just water. Sun Shield 23, reduces glare.

Since obvious changes may be made in the specific embodiment of the invention described herein, such modifications being within the spirit and scope of the invention claimed, it is indicated that all matter contained herein is intended as illustrative and not as limited in scope.

Having thus described the invention, what I claim as new and desire to secure by letters patent of the United States is:

1. A pair of wide angle mirror assemblies adapted to be mounted on the bow or bowrail of a large sailboat comprising, a pair of mirror brackets for use in affixing the mirrors to the bow or bowrail of the sailboat, a pair of mirrors, means for mounting one of said mirrors so as to permit pivotal movement about a horizontal axis to each of said mounting brackets, and means attached to each said mirrors so that each mirror will always maintain the reflecting surface thereof in a vertical plane, said assemblies when attached to the bow of a large sailboat permitting the helmsman to see portions of the horizon, forward, around and behind the sails, which, in the absence of such device, would be obscured by opaque sail material.

* * * * *